(12) United States Patent
Doblar et al.

(10) Patent No.: US 8,249,199 B2
(45) Date of Patent: Aug. 21, 2012

(54) LOW JITTER AND HIGH BANDWIDTH CLOCK DATA RECOVERY

(75) Inventors: Drew G. Doblar, San Jose, CA (US);
Dawei Huang, San Diego, CA (US);
Gabriel C. Risk, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 746 days.

(21) Appl. No.: 12/342,825

(22) Filed: Dec. 23, 2008

(65) Prior Publication Data
US 2010/0158177 A1 Jun. 24, 2010

(51) Int. Cl.
*H04L 27/06* (2006.01)
(52) U.S. Cl. ....................................... 375/340
(58) Field of Classification Search ................. 375/376, 375/354, 362, 227
See application file for complete search history.

(56) References Cited

U.S. PATENT DOCUMENTS

| | | | | |
|---|---|---|---|---|
| 7,308,060 B1 * | 12/2007 | Wall et al. | ...................... | 375/355 |
| 2004/0120426 A1 * | 6/2004 | Dagdeviren et al. | .......... | 375/340 |
| 2005/0163272 A1 * | 7/2005 | Payne et al. | ................... | 375/354 |
| 2007/0146014 A1 * | 6/2007 | Cheung | ........................... | 327/20 |
| 2008/0111633 A1 * | 5/2008 | Cranford et al. | ................ | 331/10 |

OTHER PUBLICATIONS

Stojanovic,"Channel-Limited High-Speed Links: Modeling, Analysis and Design", Sep. 2004,PhD Thesis Stanford University.*
Musa, "High-Speed Baud-Rate Clock Recovery", Jul. 2008, PhD Thesis University of Toronto.*
Stojanovic, Chanel Limited High Speed Link: Modeling, Analysis, and Design, Sep. 2004, Ph.D Thesis Stanford University.*
Musa, High Speed Baud-Rate Clock Recovery, Jul. 2008, Ph.D thesis University of Toronto.*

* cited by examiner

*Primary Examiner* — David C. Payne
*Assistant Examiner* — Wednel Cadeau
(74) *Attorney, Agent, or Firm* — Osha Liang LLP (57) ABSTRACT

A method of implementing a low jitter and high bandwidth clock and data recovery (CDR) apparatus includes acquiring early, optimal, and late votes; determining which votes are allowed and weighted; disallowing votes not determined to as allowed; weighing votes, wherein votes that would make the CDR move to an extreme of a zero crossing are weighted less; and accumulating votes and adjusting a recovered clock phase based on the accumulated votes. A computer readable medium storing instructions to implement a low jitter and high bandwidth CDR apparatus, the instructions includes functionality to: acquiring early, optimal, and late votes; determining which votes are allowed and weighted; disallowing votes not determined to as allowed; weighing votes, wherein votes that would make the CDR move to an extreme of a zero crossing are weighted less; and accumulating votes and adjust recovered clock phase.

18 Claims, 8 Drawing Sheets

LOW JITTER AND HIGH BANDWIDTH CLOCK DATA RECOVERY

BACKGROUND OF THE DISCLOSURE

1. Field of the Disclosure

Embodiments of the present disclosure relate to a method of implementing a low jitter and high bandwidth clock and data recovery (CDR) apparatus.

2. Description of the Related Art

Integrated circuits (IC) may need to communicate with other ICs or modules in any given system design. The ever increasing processing and computation speed of ICs has created a growing demand for high-bandwidth input and output (IO) on these ICs, which is achieved by increasing the signaling rate of each IO pin as well as increasing the number of IO pins on the chip. While some internal circuits can operate at 10's of Gbps, the performance of the link is limited by the characteristics of the channel, namely, the electrical path from one IC die to the other. In order to achieve desired data rates over existing channels, many multi-Gbps links use complex signal processing to overcome the channel limitations. One such example for improving performance of IOs is to change the signaling method and the channel media by using high speed serializer/deserializer (SERDES) link. These circuits convert data between serial data and parallel interfaces in each direction.

Implementations of SERDES are sometimes combined with implementations of encoding/decoding circuits. The purpose of encoding/decoding is typically to place at least statistical bounds on the rate of signal transitions to allow for easier clock recovery in the receiver, to provide framing, and to provide DC balance. A common coding scheme used with SERDES is 8B/10B encoding. This supports DC-balance, provides framing, and guarantees transitions. The guaranteed transitions allow a receiver to extract the embedded clock. The control codes allow framing, typically on the start of a packet. The 8B/10B SERDES parallel side interfaces may have 1 clock line, 1 control line and 8 data lines, however it may have the clock and control lines integrated in the data lines. Another common coding scheme used with SERDES is 64B/66B encoding. This scheme statistically delivers DC-balance and transitions. Framing is delivered through the deterministic transitions of the added framing bits. Also, SERDES can be implemented in combination with pseudo-random binary sequence (PRBS) scrambling data. There exist a number of other coding schemes that could also be used to implement SERDES that provide the necessary transitions for clock extraction.

A CDR circuit is used to align sampling clock at the receiver with incoming data adaptively and is critical for high speed SERDES link. Working with a received signal can pose the issues of clock recovery and optimum phase selection. Clock recovery is the process of synchronizing a receiver clock with the transmitter clock used when the signal was generated. Phase selection is the process of selecting a phase with respect to the receiver clock at which to sample the received signal. Such a phase selection is acceptable when it provides a good signal-to-noise ratio (SNR) for accurate data recovery from the received signal. The process of clock recovery, and sometimes phase selection as well, is called clock and data recovery. The concerns that are raised are those of area, power, and latency of the implemented CDR.

Many clock and data recovery schemes today use a phase lock loop (PLL). This method is costly both in area and power because PLLs are known to consume a relatively large amount depending on the application. Another method of CDR is 2×-oversampling the data. When data rates are slower (less than 5 or 6 Gbps), a popular choice of CDR is bang-bang CDR, which relies on 2×-oversampling of the incoming data.

Another algorithm for timing extraction is called the Mueller-Muller (MM) algorithm which was first described in a journal article in 1975. The MM-algorithm is a method for generating a timing error signal H(-1) (also called a timing error detector). The MM algorithm only requires one sample per symbol and has been implemented in some applications for long distance telecom.

CDR methods would benefit from having a high bandwidth. Specifically, a high bandwidth allows for tracking and filtering of higher frequency jitters, both deterministic jitter and lower frequency phase noise of random noise jitter in the distributed and multiplied reference block. Deterministic jitter is a type of data signal or clock timing jitter that is predictable and therefore reproducible. Periodic jitter, data-dependent jitter, and duty-cycle dependent jitter are all types of deterministic jitter. Random noise jitter, also called Gaussian jitter, is unpredictable electronic timing noise. Jitter is important to one of ordinary skill in the art due to the trend of increasing clock frequencies in digital electronic circuitry. Higher clock frequencies have smaller eye openings, and thus impose tighter tolerances on jitter.

On the other hand, a desirable trait of a lower bandwidth CDR is the ability to have a low CDR jitter as compared to a higher bandwidth CDR. What provides for this is the ability of the recovered clock phase to move very sluggishly in response to changes in the signal. The recovered clock phase wants to find the average point between all zero crossings. A perfect CDR, from the data dependent jitter (DDJ) data eye opening sense, would lock to the center of an eye diagram and never move. Current standards specify very high CDR bandwidths that can be challenging because they lead to higher DDJ induced by CDR jitter. High orders of averaging, such as up/down threshold counter CDR, is relatively simple to implement and may provide an additional level of complexity to jitter reduction.

Overall, a mix of attributes are desirable. Namely, a high CDR bandwidth (e.g. Fbaud/1667) to meet the small signal response of standards like IEEE 802.3ap. Additionally, not allowing such a high bandwidth, and therefore an inherently jittery, CDR to track DDJ created by data zero crossings that are near the extremes of the zero crossing probability density function (pdf). This may be beneficial because the CDR would likely not respond as strongly to zero crossings that may move the recovered clock phase quickly from its desired nominal position at the mean between all data zero crossings.

SUMMARY OF THE INVENTION

One or more embodiments of the present invention involve a method of implementing a low jitter and high bandwidth clock and data recovery (CDR) apparatus comprising acquiring early, optimal, and late votes; determining which votes are allowed and weighted; disallowing votes not determined to as allowed; weighing votes, wherein votes that would make the CDR move to an extreme of a zero crossing are weighted less; and accumulating votes and adjusting a recovered clock phase based on the accumulated votes.

One or more embodiments of the present invention involve a computer readable medium storing instructions to implement a low jitter and high bandwidth CDR apparatus, the instructions includes functionality to: acquiring early, optimal, and late votes; determining which votes are allowed and weighted; disallowing votes not determined to as allowed; weighing votes, wherein votes that would make the CDR move to an extreme of a zero crossing are weighted less; and accumulating votes and adjust recovered clock phase.

Other aspects and advantages of the invention will be apparent from the following description and drawings.

DETAILED DESCRIPTION

Embodiments of the present disclosure will be presented below with reference to the drawings.

Figure 2:
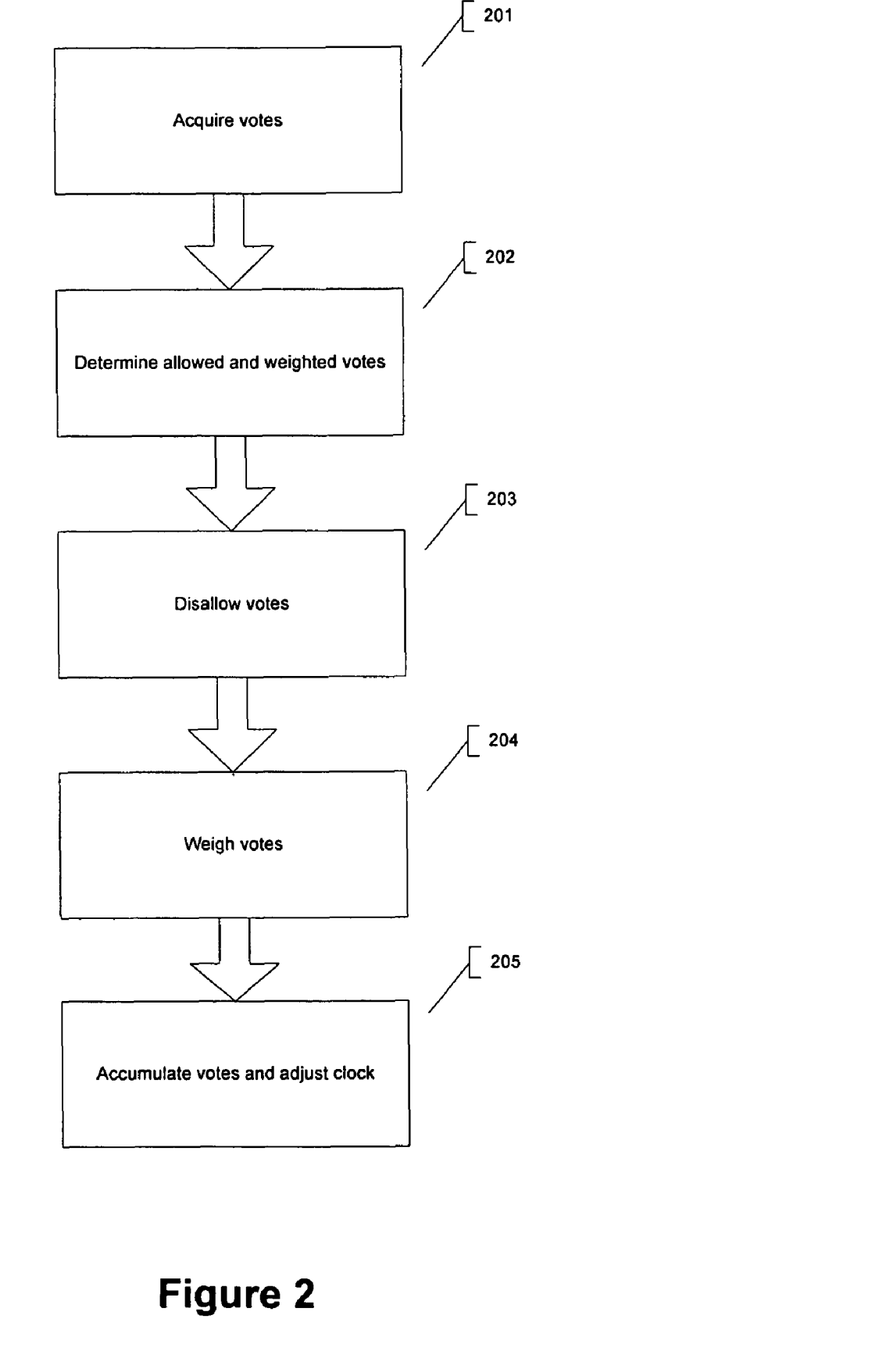
FIG. 2 shows a flow chart of the method steps to one embodiment of the invention.

In one aspect, embodiments disclosed herein relate to a method of implementing a low jitter and high bandwidth clock and data recovery (CDR) apparatus. Referring now to FIG. 2, a flowchart showing method steps in accordance with embodiments disclosed herein is shown. Namely, a step of acquiring 201 early, optimal, and late votes occurs first. The votes may be samples taken from a received signal that is received by the CDR apparatus. These samples may be a combination of early, optimal, or late votes. In another embodiment, the samples may all be of a single type, namely: early, optimal, or late votes. The acquisition of these votes may occur in real time as the signal enters the CDR apparatus. In another embodiment of the invention, the votes may be acquired over time when the input signal is placed first into a buffer then filtered and sampled. In another embodiment of the invention the votes are a combination of both real time and buffered sampling. A person of ordinary skill in the art knows that other means of sample acquisition exist and are well known in the art, all of which would function in providing votes.

Figure 3A:
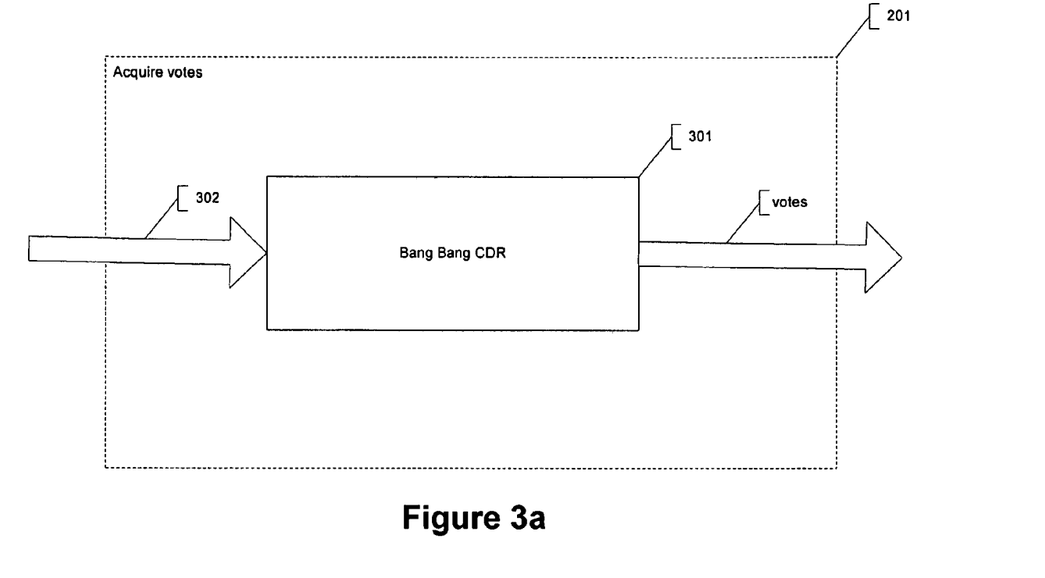
FIG. 3a shows a block diagram depicting a bang-bang CDR implementation of the acquiring method step.

In another embodiment of the invention, as shown in FIG. 3a, acquiring early and late votes further comprises acquiring early and late votes using bang-bang CDR 301 on serializer/deserializer (SERDES) links 302. In one embodiment of the present invention, an improved mechanism is provided, which enables an over sampled waveform to be constructed for a set of signals received by a receiver, but which does not require an exorbitant amount of resources on the receiver. In accordance with this embodiment, the oversampled waveform is constructed by way of cooperation between the receiver and a waveform construction mechanism (WCM).

The receiver receives the incoming signals, samples the incoming signals, stores subsets of the sample values into a set of registers, and subsequently provides the subsets of sample values to the WCM. The WCM in turn sorts through the subsets of sample values, groups them, organizes them into proper order, and "stitches" them together to construct the oversampled waveform for the set of signals.

To limit the amount of resources implemented on the receiver, the receiver in one embodiment is not endowed with enough storage to store all the sample values for all of the incoming signals. Rather, the receiver is implemented with sufficient storage to store just a subset of the sample values at a time. This means that even though the receiver is sampling all of the incoming signals, it is storing only a subset of the sample values at a time into a set of registers. Because the receiver stores only a subset of the sample values at a time, the incoming signals are set repeatedly by the transmitter; over time, the receiver will eventually store all of the subsets of sample values corresponding to all of the incoming signals. After a subset of sample values are stored, they are provided to the WCM. Thereafter, the receiver stores another subset of sample values into the same set of registers (i.e., the register values are over written with the new sample values; that way only one set of registers is needed), and provides those sample values to the WCM. The receiver does this repeatedly so that the WCM receives a plurality of sets of sample values from the receiver.

In one embodiment, the sets of sample values sent by the receiver are not sent in any predetermined order; thus, it is not immediately clear to the WCM how the sets of sample values relate to each other and in what order they should be arranged to construct the oversampled waveform. In one embodiment, it is up to the WCM to sort, group, and order the sets of sample values, and to "stitch" them together to construct the oversampled waveform. With proper cooperation between the receiver and the WCM, and with proper processing logic on the WCM, it is possible to construct the oversampled waveform for the incoming signals without requiring large amounts of resources on the receiver.

Figure 3B:
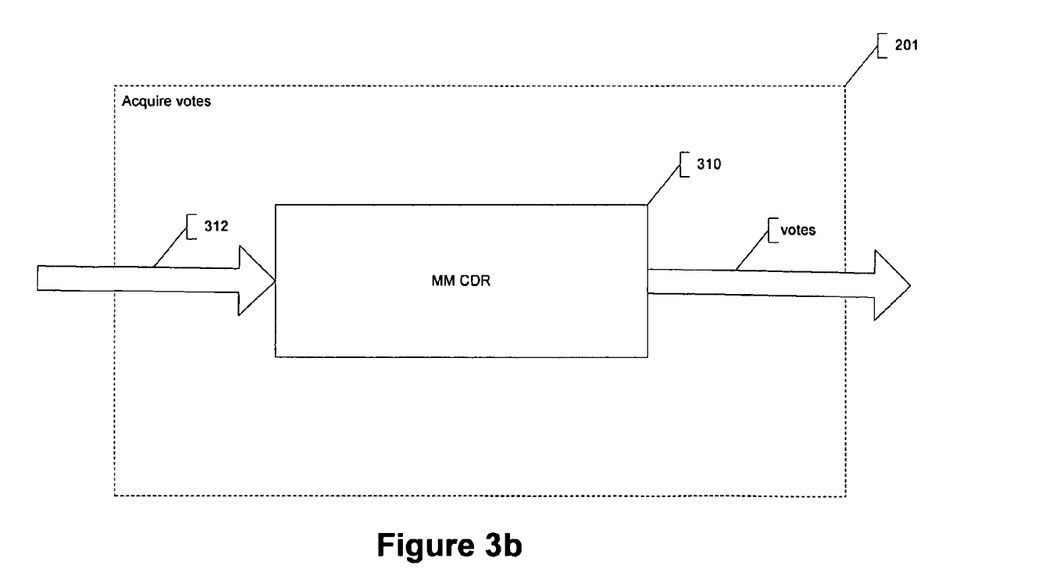
FIG. 3b shows a block diagram depicting a Mueller-Muller (MM) CDR implementation of the acquiring method step.

In another embodiment of the invention, as shown in FIG. 3b, acquiring early and late votes further comprises acquiring early and late votes using Mueller-Muller CDR 310 on analog or digital SERDES links 312. The Mueller-Muller (MM) algorithm set the theoretical framework for baud-rate CDR design. One or more embodiments of the present invention implement an analog baud-rate MM-based CDR for acquiring early, optimal, and late samples or "votes."

Figure 1A:
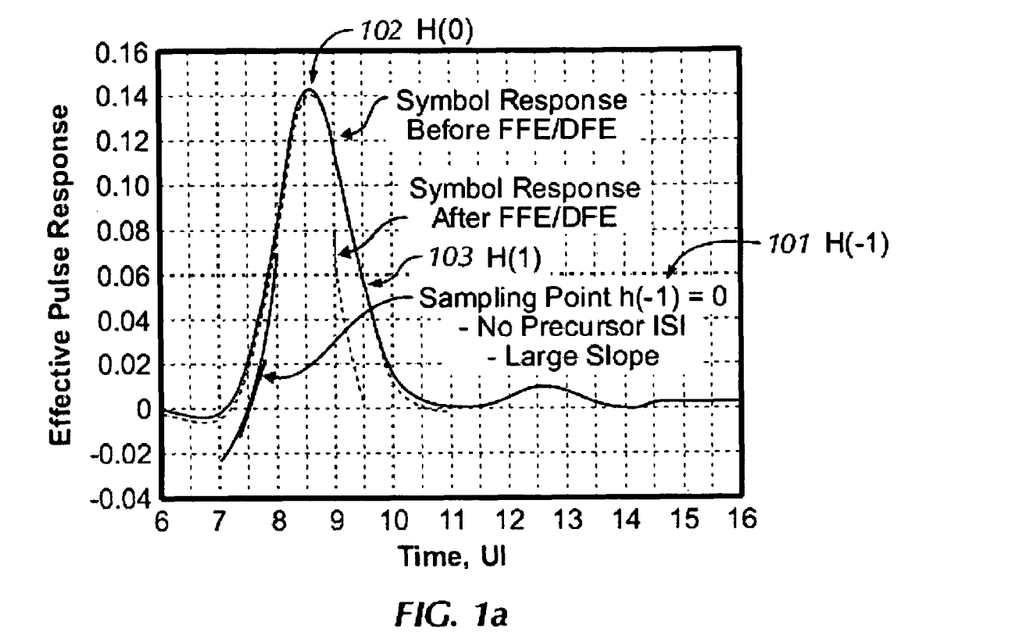
FIG. 1a shows a single symbol waveform with sampling points.
Figure 1B:
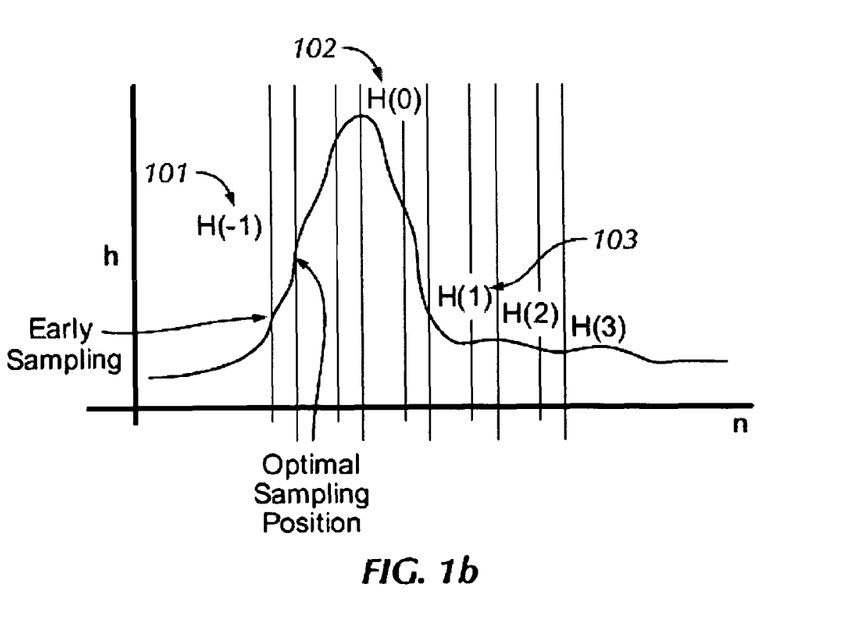
FIG. 1b shows another single symbol waveform with sampling points.

Specifically, in one or more embodiments of the present invention, for a baud-rate CDR algorithm based on the MM-algorithm approach, an optimal sampling time is that which the precursor H(-1) 101 (also called a timing error signal) of a symbol response is equal to a set threshold. For example, in FIG. 1a, the threshold is set to zero, but this is not necessarily the case for all possible adaptations. It may be desirable to set the threshold to a value slightly above zero along the symbol curve. If H(-1) 101 is less than the threshold, then the CDR is sampling the received signal early. If H(-1) 101 is larger than the threshold, then the CDR is sampling the received signal later than desired. Therefore, by extracting the H(-1) 101 information from the incoming data stream, the sampling point of a receiver can lock to the optimal position. An example is shown in FIG. 1a and FIG. 1b.

By using H(-1) 101 as a timing error value indicator, CDR can lock into the optimal sampling point regardless of the equalization strength. Also, using a H(-1) 101 equaling threshold approach reserves the flexibility to lock to any point of the rising edge symbol response. In previous digital implementations, one could only lock to H(-1) 101 equals zero. Thus, the previous approach required a dip crossing zero position at precursor location, which had to be guaranteed by using either precursor tap of TX finite impulse response (FIR) or RX FEE, or both. So, for example, by selecting a point part of the way up the rising edge of the symbol curve as our threshold value for an ideal H(-1) 101, in one or more embodiments as shown in FIG. 1*b*, when an early sample is taken, that value will be within a range including values above zero up to the threshold value of H(-1) 101.

The extraction of H(-1) from incoming data stream relies on the direct comparison of neighboring data samples. There are three methods for such comparison. The first method is to digitize the incoming samples and to compare them to the neighbor in time sample after a one unit interval (UT) delay (1UI). This method is computationally intense for 10 Gbps IO applications. The second method is to delay the previous bit for 1UI in an analog domain then use a comparator to compare it with the current bit. The challenge for this method is that the 1UI analog delay has to be accurate in time and have low distortion in amplitude. The third method is to compare the current bit and the previous bit to a common reference, which should be the cursor H(0). Thus, this method relies on an accurate H(0), which also needs to be extracted from incoming data stream.

In one or more embodiments of the present invention, the analog implementation of a baud-rate MM-based CDR may have the ability to be implemented with relatively small overhead. Additionally, in one or more embodiments, accuracy is not limited by quantization error because of the analog nature of the overall system. The adjustable threshold H(-1) in the comparator stage eliminates the need for TX pre-cursor and RX FFE or DFE which where necessary in the digital scheme. Eliminating the need for the TX pre-cursor and RX FEE or Decision-Feedback Equalizer (DFE) reduces the latency of the overall design.

There are many different options to implement this algorithm with different levels of timing accuracy and at different power and area costs. For applications that require 100s of SERDES lanes, it is prudent to optimize the implementation for lower power and area. In addition, to obtain best system performance, it is also equally important to have the lowest possible latency through the RX main data path 120.

In another aspect, embodiments disclosed herein relate to a method of implementing a low jitter and high bandwidth CDR apparatus that determines which votes will be allowed and weighted 202. In one embodiment of the invention the CDR will determine which votes will not be allowed according to set criteria, and then of those allowed, will determine how each vote will be weighted according to the same criteria. In a further embodiment of the invention the criteria used may be the proximity to a zero crossing of each particular sample. In another embodiment of the invention the criteria may be a stored hysteresis sampling containing at least one sample of the input signal. In another embodiment of the invention, different criteria is used for determining which votes will be allowed and how the votes will be weighted. For example, determining the votes that are allowed may be done using criteria specific to previously known votes that are historically inaccurate due to channel noise, while the determining of which votes are weighted may be done using criteria specific to the proximity to zero crossings according to an eye diagram mapping of the votes.

Figure 4A:
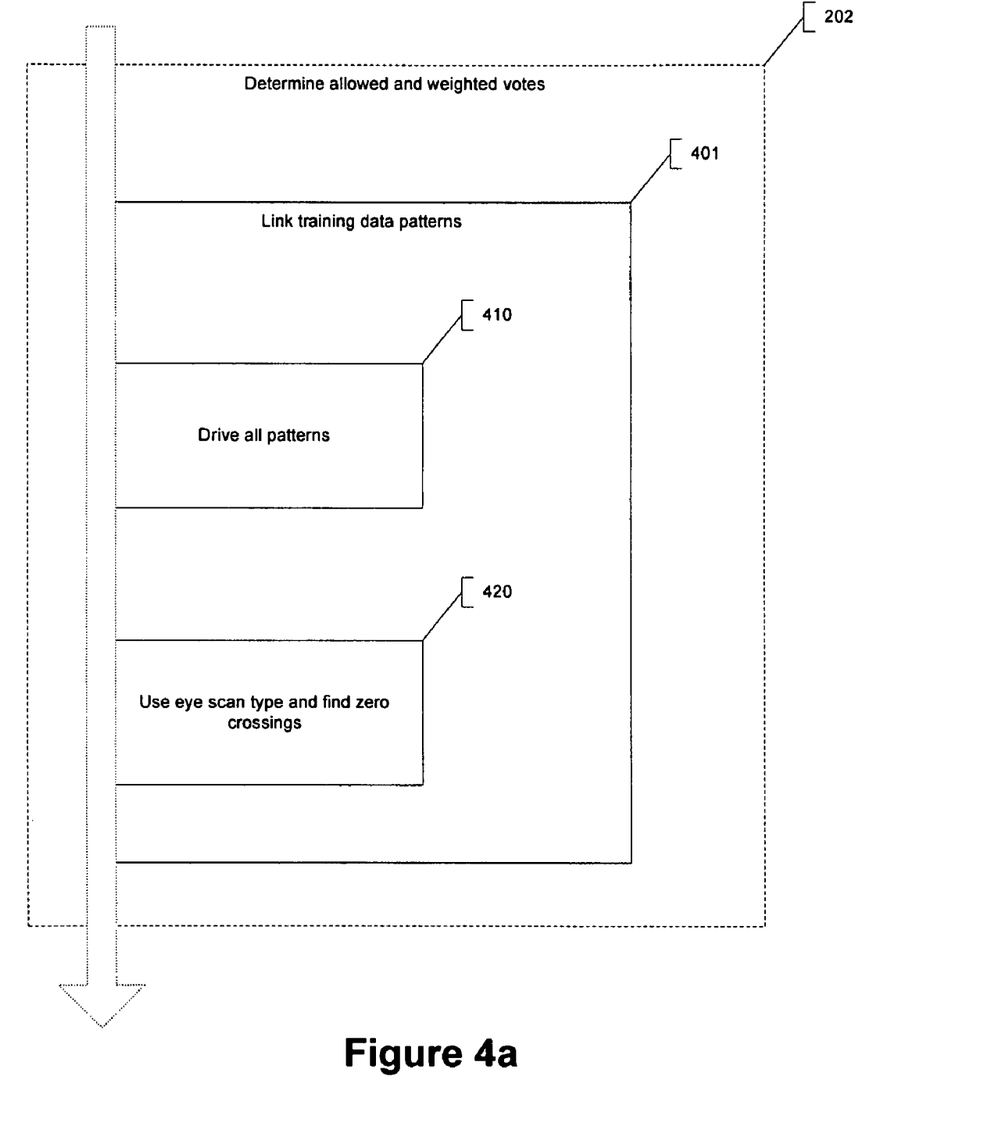
FIG. 4a shows flow chart depicting an embodiment of the invention wherein determining which votes will be allowed and weighted has sub-steps.

In another embodiment of the invention, as shown in FIG. 4*a*, determining which votes will be allowed and weighted 202 further comprises link training all known relevant data patterns 401. In a further embodiment of the invention, link training all known relevant data patterns further consist of driving all patterns 410 and using an eye diagram to determine the location of the zero crossing 420. It is well known in the art that, an eye pattern, also known as an eye diagram is an oscilloscope display in which a digital data signal from a receiver is repetitively sampled and applied to the vertical input, while the data rate is used to trigger the horizontal sweep. The diagram is called an eye diagram because the pattern looks like a series of eyes between a pair of bars.

Figure 4B:
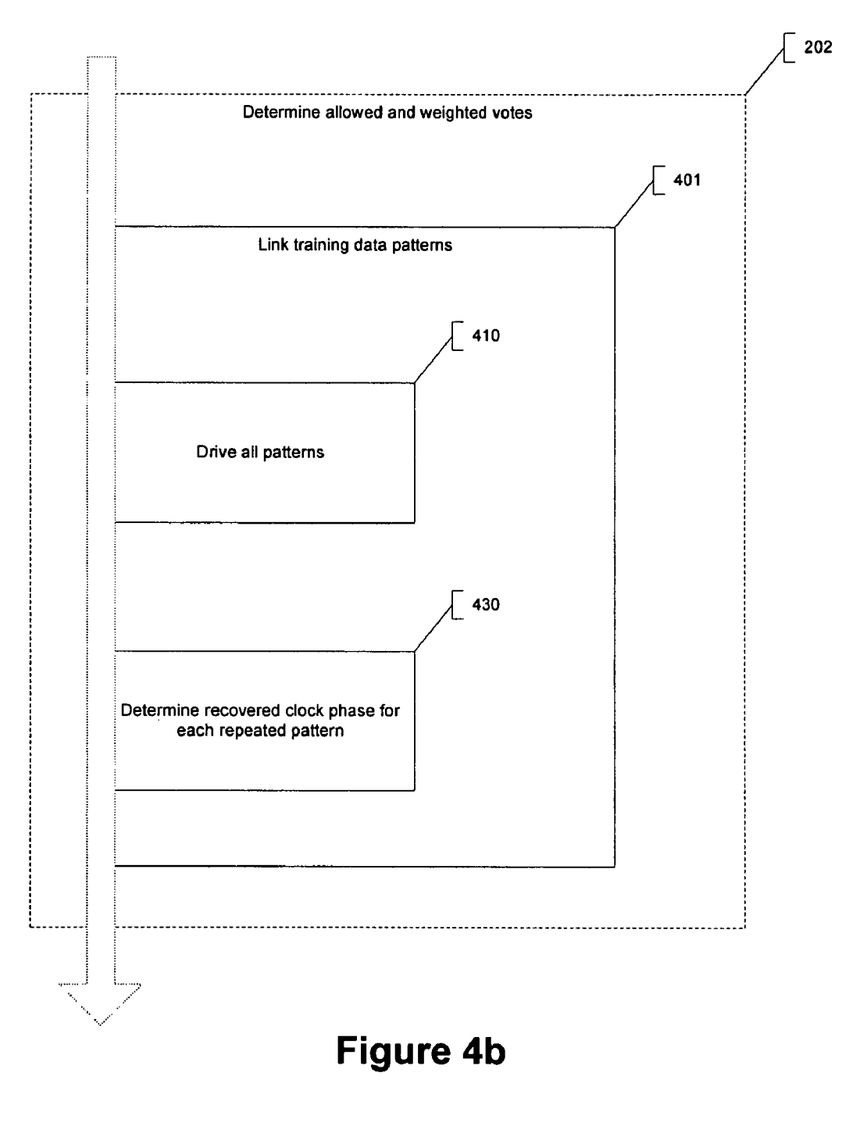
FIG. 4b shows flow chart depicting another embodiment of the invention wherein determining which votes will be allowed and weighted has sub-steps.

In another embodiment of the invention, as shown in FIG. 4*b*, link training all known relevant data patterns 401 further consists of driving all patterns 410 and determining the recovered clock phase for each repeated data pattern 430. In a further embodiment of the invention a pulse response tool may allow the determination of which data zero crossings result from which subset of data patterns.

Figure 5:
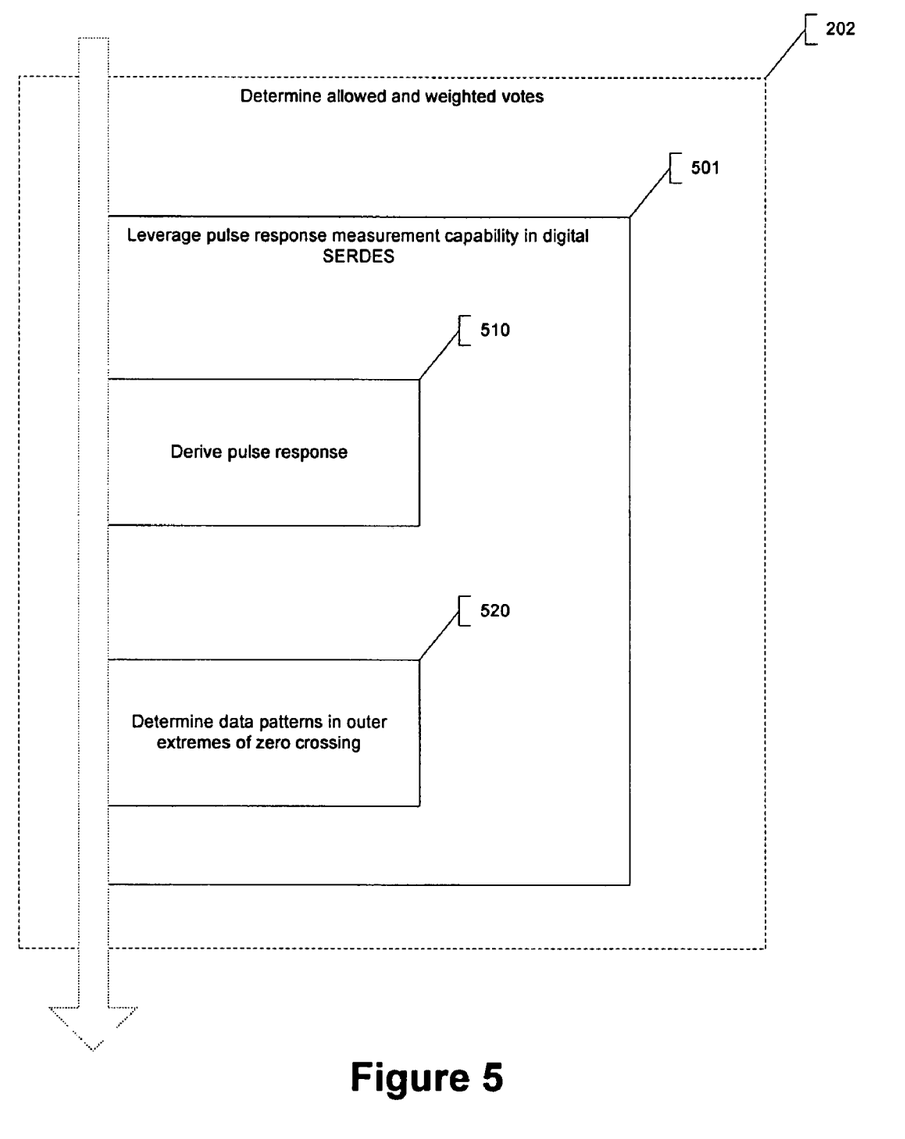
FIG. 5 shows a flow chart depicting another embodiment of the invention wherein the determining which votes will be allowed and weighted has sub-steps.

In another embodiment of the invention, as shown in FIG. 5, determining which votes will be allowed and weighted 202 further consists of leveraging the pulse response measurement capability in the digital SERDES 501. In a further embodiment of the invention leveraging the pulse response measurement capability in the digital SERDES 501 further consists of deriving a pulse response from the data through a training sequence 510 and determining which data patterns result in outer extremes of zero crossing through a pulse response eye diagram analysis script using the pulse response 520.

In another aspect, embodiments disclosed herein relate to a method of implementing a low jitter and high bandwidth CDR apparatus that disallow votes not determined to be allowed 203. Referring now to FIG. 2, the flowchart showing method steps in accordance with embodiments disclosed herein, the step of disallowing votes is shown to occur after acquisition and determination. However, it may occur at the same time as the determination step such that as they are determined to be not allowed, they are also simultaneously disallowed. A person of ordinary skill in the art will appreciate that this disallowing could occur before the weighing of the allowed votes that have been deemed in need of a weight. In the alternative, a person of ordinary skill in the art would also appreciate that the disallowing of votes could also occur later in the method, even as far as the last step. This embodiment would allow disallowed voted to be held onto until the end of the process. The disallowed votes could be used at the end of the process to help adjust in the case where a clock adjustment occurs and is found to be adjusting too slowly, quickly, or inaccurately.

In another aspect, embodiments disclosed herein relate to a method of implementing a low jitter and high bandwidth CDR apparatus that weigh votes, wherein votes that would make the CDR move to the extreme of a zero crossing are weighted less 204. In one embodiment of the invention a weight function is used. A weight function is a mathematical device used when performing an integral, average, or sum of values, or votes, in order to give some vote elements more of a "weight" than other votes. Weight functions can be constructed in both discrete and continuous settings. In a further embodiment of the invention, when determining what weight to give votes that are close to the zero crossing as compared to the votes that are farther from the zero crossing one of ordinary skill in the art would appreciate that the vote near the zero crossing could both be lowered in value, or weight, in comparison to the votes farther from the zero crossing.

In another embodiment of the invention the votes farther from the zero crossing could be increased in value in comparison with the votes near the zero crossing. In another embodiment of the inventions the value of weight to be added or subtracted can be looked up in a look up table. In another embodiment of the invention the weighing values may be determined depending on the proximity of each vote to the zero crossing. In yet a further embodiment of the invention the weight values may be determined according to a well known mathematical formulation wherein other values and the surrounding system can be taken into account to adjust the weighting of the votes close to and far from the zero crossing.

The weighing of the votes can be implemented by a plurality of means known in the art. For example, if the votes are stored in analog signals, where the amplitude represents the value, then the votes farther from the zero crossing could be amplified and the votes close to the zero crossing could undergo amplitude modulation through a plurality of well known circuits to decrease the value, or weight, of the votes closer to the zero crossing. In another embodiment where the votes are stored digitally, specifically, a pattern of zeros and one signals represent the weight of the vote, a well known adjustment of the pattern to represent a weight that is either higher or lower may be done which is well known in the art. In another embodiment of the invention the method of implementing a low jitter and high bandwidth CDR apparatus further consists of adding a lookup table in the CDR and determining which votes get weighted less and apply the weights. A person of ordinary skill in the art can appreciate that other means exist for adjusting the weight of votes.

In another aspect, embodiments disclosed herein relate to a method of implementing a low jitter and high bandwidth CDR apparatus that accumulates votes and adjusts the recovered clock phase 205. In one embodiment of the invention the accumulation may occur one vote at a time and a small adjustment made as each vote is accumulated. In another embodiment of the invention, a grouping of votes is accumulated first and then the recovered clock phase is adjusted. In a further embodiment of the invention, the adjustment can be a set value stored in a list, wherein depending on the weight of the vote, or grouping of votes, the set adjustment value will be a certain amount. In another embodiment of the invention, the adjustment value can be determined by a direct application of the weighted votes' phase to the recovered clock phase adjustment.

Figure 6:
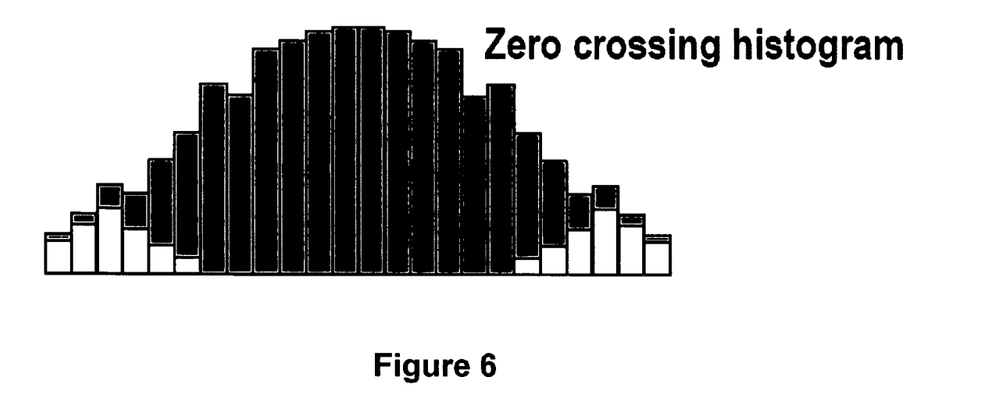
FIG. 6 shows zero crossing histogram.

In another embodiment of the invention, determining the several bit data pattern that reaches a zero crossing extreme may be done from the pulse response. In one exemplary embodiment, the data pattern depth is limited to eight bits for implementation purposes. A person of ordinary skill in the art will appreciate that an eight bit pattern on a channel with seventeen bits of memory will not get to an extreme of zero crossings, but the first eight bits of this worst seventeen bit pattern would get near the edges of the zero crossing distribution shown in FIG. 6. This eight bit data pattern, followed by all combinations of the nine subsequent bits would represent the zero crossings in light shading 610 as shown in the histogram distribution shown in FIG. 6. In another embodiment of the invention, the CDR voting weight of all the seventeen bit patterns is reduced by a programmable factor. Overall CDR bandwidth is not impacted much, and the CDR can still meet Fbaud/1667 requirements and standards. For ease of implementation, a person of ordinary skill in the art can invoke symmetry and use the knowledge that the eight bit data and its complement represent both early and late edges of the zero crossing distribution. Additional N bit patterns could also be weighted appropriately in this fashion.

Figure 7:
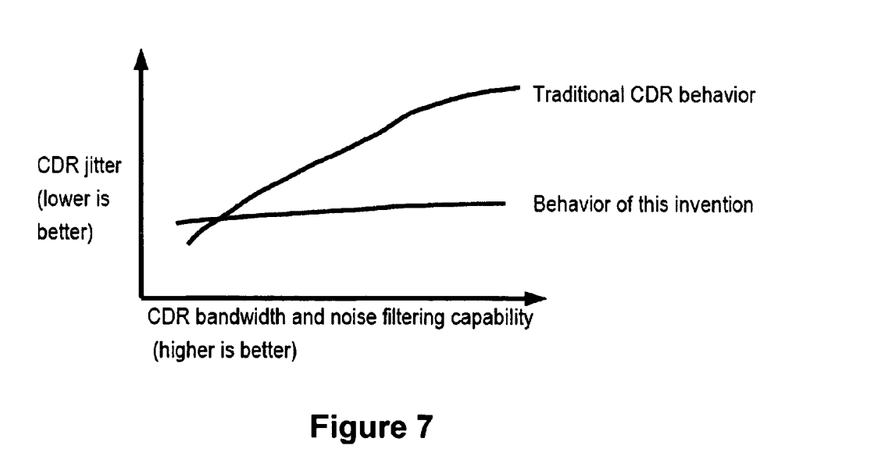
FIG. 7 shows a performance chart of an embodiment of the invention.

One or more embodiments of the present invention may have one or more of the following advantages. The present invention may give both responsiveness and high bandwidth for noise and reference clock random jitter filtering. Reduced CDR deterministic jitter due to tracking of incoming data zero crossings (or Mueller-Muller recovered clock phase extremes). These give later effective timing margins and lower bit error rates as shown in FIG. 7.

Figure 8:
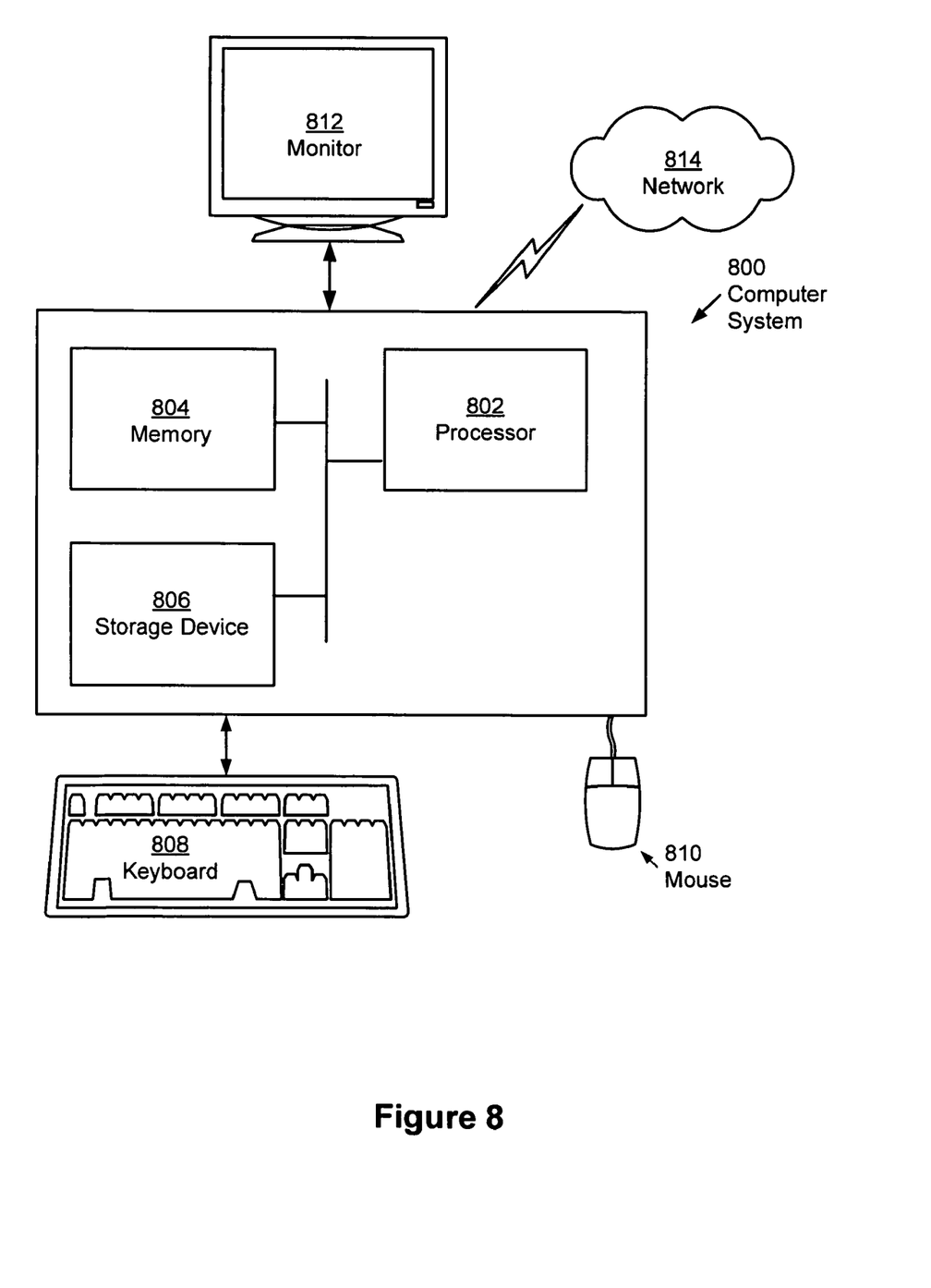
FIG. 8. shows a computer system in accordance with one or more embodiments of the invention.

Embodiments of the invention may be implemented on virtually any type of computer regardless of the platform being used. For example, as shown in FIG. 8, a computer system (800) includes one or more processor(s) (802), associated memory (804) (e.g., random access memory (RAM), cache memory, flash memory, etc.), a storage device (806) (e.g., a hard disk, an optical drive such as a compact disk drive or digital video disk (DVD) drive, a flash memory stick, etc.), and numerous other elements and functionalities typical of today's computers (not shown). The computer (800) may also include input means, such as a keyboard (808), a mouse (810), or a microphone (not shown). Further, the computer (800) may include output means, such as a monitor (812) (e.g., a liquid crystal display (LCD), a plasma display, or cathode ray tube (CRT) monitor). The computer system (800) may be connected to a network (814) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (800) includes at least the minimal processing, input, and/or output means necessary to practice embodiments of the invention.

Further, those skilled in the art will appreciate that one or more elements of the aforementioned computer system (800) may be located at a remote location and connected to the other elements over a network. Further, embodiments of the invention may be implemented on a distributed system having a plurality of nodes, where each portion of the invention (e.g., COT manager, multi-federation protocol manager, identity provider, etc.) may be located on a different node within the distributed system. In one embodiment of the invention, the node corresponds to a computer system. Alternatively, the node may correspond to a processor with associated physical memory. The node may alternatively correspond to a processor or a micro-core on a processor with shared memory and/or resources. Further, software instructions to perform embodiments of the invention may be stored on a computer readable medium such as a compact disc (CD), a diskette, a tape, a file, or any other computer readable storage device.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A method of implementing a low jitter and high bandwidth clock and data recovery (CDR) apparatus comprising:
   acquiring early votes, optimal votes, and late votes;
   determining which of the early votes, optimal votes, and late votes are allowed and weighted based on a criteria;
   disallowing the early votes, optimal votes, and late votes not determined as allowed based on the criteria;
   weighing the early votes, optimal votes, and late votes determined as allowed based on the criteria, wherein the early votes, optimal votes, and late votes that would make the CDR move to an extreme of a zero crossing are weighted less;

accumulating the allowed and weighted early votes, optimal votes, and late votes and adjusting a recovered clock phase based on the accumulated early votes, optimal votes, and late votes;
adding a lookup table in the CDR, wherein the lookup table comprises weights;
determining which of the early votes, optimal votes, and late votes to weigh; and
applying the weights to the early votes, optimal votes, and late votes, wherein the value of weight to be added or subtracted is looked up in the lookup table.

2. The method of implementing a low jitter and high bandwidth CDR apparatus of claim 1 wherein acquiring the early votes and late votes further comprises:
acquiring the early votes and late votes using bang-bang CDR on serializer/deserializer (SERDES) links.

3. The method of implementing a low jitter and high bandwidth CDR apparatus of claim 1 wherein acquiring the early votes and late votes further comprises:
acquiring the early votes and late votes using Mueller-Muller CDR on analog or digital SERDES links.

4. The method of implementing a low jitter and high bandwidth CDR apparatus of claim 1 wherein determining which of the early votes, optimal votes, and late votes will be allowed and weighted further comprises:
link training all known relevant data patterns.

5. The method of implementing a low jitter and high bandwidth CDR apparatus of claim 4 wherein link training all known relevant data patterns further comprises:
driving all patterns; and
using an eye diagram to determine a location of the zero crossing.

6. The method of implementing a low jitter and high bandwidth CDR apparatus of claim 4 wherein link training all known relevant data patterns further comprises:
driving all patterns; and
determining a recovered clock phase for each repeated data pattern.

7. The method of implementing a low jitter and high bandwidth CDR apparatus of claim 1 wherein determining which of the early votes, optimal votes, and late votes are allowed or weighted further comprises:
leveraging a pulse response measurement capability in the digital SERDES.

8. The method of implementing a low jitter and high bandwidth CDR apparatus of claim 7 wherein leveraging the pulse response measurement capability in the digital SERDES further comprises:
deriving a pulse response from the data through a training sequence; and
determining which data patterns result in outer extremes of a zero crossing through a pulse response eye diagram analysis script using the pulse response.

9. A non-transitory computer readable medium storing instructions to implement a low jitter and high bandwidth CDR apparatus, the instructions comprising functionality to:
acquiring early votes, optimal votes, and late votes;
determining which of the early votes, optimal votes, and late votes are allowed and weighted based on a criteria;
disallowing the early votes, optimal votes, and late votes not determined as allowed based on the criteria;
weighing the early votes, optimal votes, and late votes determined as allowed based on the criteria, wherein the early votes, optimal votes, and late votes that would make the CDR move to an extreme of a zero crossing are weighted less;
accumulating the early votes, optimal votes, and late votes and adjusting a recovered clock phase based on the accumulated the early votes, optimal votes, and late;
adding a lookup table in the CDR, wherein the lookup table comprises weights;
determining which votes to weigh; and
applying the weights to the votes, wherein the value of weight to be added or subtracted is looked up in the lookup table.

10. The non-transitory computer readable medium of claim 9, wherein acquiring the early votes and late votes further comprises:
acquiring the early votes and late votes using bang-bang CDR on SERDES links.

11. The non-transitory computer readable medium of claim 9, wherein acquiring the early votes and late votes further comprises:
Acquiring the early votes and late votes using Mueller-Muller CDR on analog or digital SERDES links.

12. The non-transitory computer readable medium of claim 9, wherein determining which of the early votes, optimal votes, and late votes are allowed and weighted further comprises:
link training all known relevant data patterns.

13. The non-transitory computer readable medium of claim 12, wherein link training all known relevant data patterns further comprises:
driving all patterns; and
using an eye diagram to determine a location of the zero crossing.

14. The non-transitory computer readable medium of claim 12, wherein link training all known relevant data patterns further comprises:
driving all patterns; and
determining a recovered clock phase for each repeated data pattern.

15. The non-transitory computer readable medium of claim 9, wherein determining which of the early votes, optimal votes, and late votes are allowed or weighted further comprises:
leveraging a pulse response measurement capability in the digital SERDES.

16. The non-transitory computer readable medium of claim 15, wherein leveraging the pulse response measurement capability in the digital SERDES further comprises:
deriving a pulse response from the data through a training sequence; and
determining which data patterns result in outer extremes of a zero crossing through a pulse response eye diagram analysis script using the pulse response.

17. The method of implementing a low jitter and high bandwidth CDR apparatus of claim 1 wherein the criteria is one selected from a group consisting of a proximity to a zero crossing of each particular sample, a stored hysteresis sampling containing at least one sample of an input signal, information specific to previously known votes that are historically inaccurate due to channel noise, and proximity to zero crossings according to an eye diagram mapping of the votes.

18. The non-transitory computer readable medium of claim 9, wherein the criteria is one selected from a group consisting of a proximity to a zero crossing of each particular sample, a stored hysteresis sampling containing at least one sample of an input signal, information specific to previously known votes that are historically inaccurate due to channel noise, and proximity to zero crossings according to an eye diagram mapping of the votes.

* * * * *